US012738781B2

(12) United States Patent
Bittner

(10) Patent No.: US 12,738,781 B2
(45) Date of Patent: Sep. 15, 2026

(54) ESM WITH REDUCED TORQUE RIPPLE

(71) Applicant: AUDI AG, Ingolstadt (DE)

(72) Inventor: Florian Bittner, Gaimersheim (DE)

(73) Assignee: AUDI AG, Ingolstadt (DE)

( * ) Notice: Subject to any disclaimer, the term of this patent is extended or adjusted under 35 U.S.C. 154(b) by 234 days.

(21) Appl. No.: 18/487,954

(22) Filed: Oct. 16, 2023

(65) Prior Publication Data

US 2024/0136870 A1 Apr. 25, 2024

(30) Foreign Application Priority Data

Oct. 18, 2022 (DE) ........................ 102022127291.5

(51) Int. Cl.
*H02K 1/24* (2006.01)
*H02K 15/02* (2025.01)
*H02K 15/12* (2025.01)
*H02K 19/02* (2006.01)

(52) U.S. Cl.
CPC ............... *H02K 1/24* (2013.01); *H02K 15/02* (2013.01); *H02K 15/12* (2013.01); *H02K 19/02* (2013.01)

(58) Field of Classification Search
CPC .. H02K 1/27; H02K 1/28; H02K 1/20; H02K 1/26; H02K 3/46; H02K 3/50; H02K 3/64; H02K 3/70
See application file for complete search history.

(56) References Cited

U.S. PATENT DOCUMENTS

2008/0203842 A1* 8/2008 Yoshikawa ............ H02K 1/276 310/156.01
2016/0211787 A1* 7/2016 Shrestha ................ H02K 19/12
2019/0020233 A1* 1/2019 Schmidt ................. H02K 19/02
2022/0045559 A1* 2/2022 Hunstable ............. H02K 21/24

FOREIGN PATENT DOCUMENTS

CN 102055258 A 5/2011
CN 213661289 U 7/2021
CN 113394936 A * 9/2021 ............. H02K 21/24
DE 102007040750 A1 3/2009
DE 102009042765 A1 3/2011
DE 102017205021 A1 * 9/2018 ............... H02K 3/47
DE 102020130124 A1 5/2022
EP 3334011 A1 6/2018
WO WO-2012119894 A2 * 9/2012 ............. H02K 55/04

OTHER PUBLICATIONS

Machine translation of CN 113394936 (Year: 2021).*
Machine translation of DE 102017205021 (Year: 2018).*
Machine translation of WO 2012119894 (Year: 2012).*

* cited by examiner

*Primary Examiner* — Bumsuk Won
(74) *Attorney, Agent, or Firm* — Seed Intellectual Property Law Group LLP

(57) ABSTRACT

Provided is an externally excited synchronous machine (ESM) with reduced torque ripple, a rotor designed for the excited synchronous machine, and a method for production of the rotor.

11 Claims, 1 Drawing Sheet

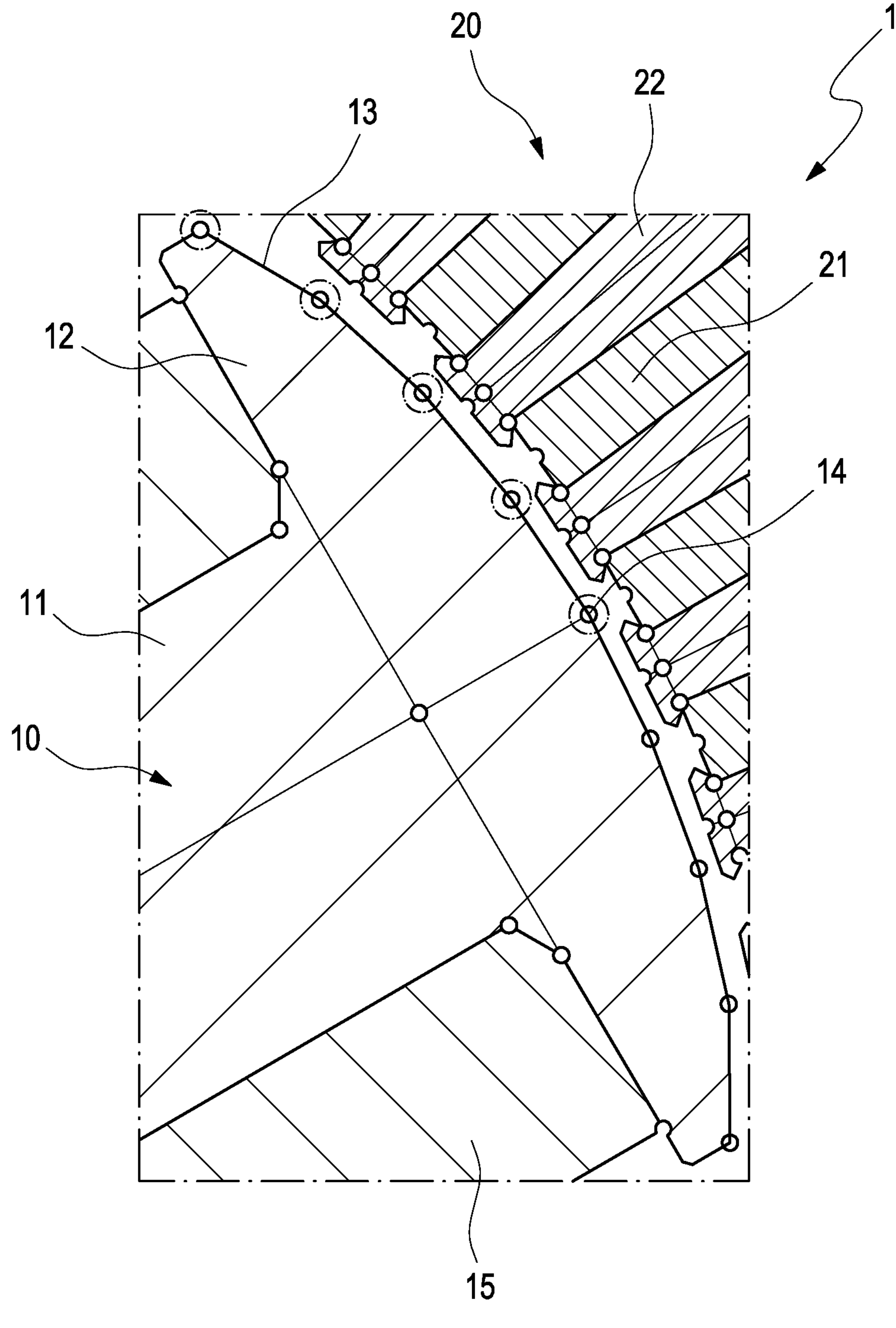
20
1
22
13
21
12
14
11
10
15

ESM WITH REDUCED TORQUE RIPPLE

BACKGROUND

Technical Field

The present disclosure relates to an externally excited synchronous machine (ESM) with reduced torque ripple, a rotor designed for the excited synchronous machine, and a method for production of the rotor.

Description of the Related Art

The ESM (externally excited synchronous machine) machine type is being used increasingly as the drive unit for electric vehicles. These electric machines are configured in the automobile as salient pole machines. It has become accepted in the industry, and also in the automobile, to employ rotors with a so-called sine field pole contour for this (e.g., per Richter, Rudolf: "Elektrische Maschinen," vol. 1, Springer, Basel 1967). The surface of the pole shoe in this case does not describe a circular arc with midpoint in the axis of rotation of the rotor, but rather the outer sides of the pole shoe are drawn further inward. The distance from the stator or the so-called air gap in this way becomes larger from the pole center to the pole outer sides. The sine field pole contour can be described mathematically and is thus implemented exactly by manufacturing technology. The goal of this pole shape is to achieve the most sinusoidal possible distribution of the rotor field in the air gap of the electric machine and thus a reduced torque ripple. Depending on the combination of groove and pole numbers and further geometrical parameters of the rotor, certain harmonics of the torque ripple can be dampened or entirely suppressed by this continuous mapping of the sine field contour. However, this procedure has little dampening effect for the torque ripple of the grooving harmonics resulting from the grooving of the stator. The torque ripple resulting from the grooving harmonics and the possibly resulting acoustic abnormalities can hardly be influenced in this way.

The document DE 10 2017 205 021 A1 discloses a pole shoe for bounding the winding surface of a rotor of an electric machine which can turn about an axis of rotation, being connected to a pole web of the rotor. An outer side of the pole shoe facing away from the pole web in the connected state comprises a first region with a substantially sinusoidal contour and a second region with a second contour. The second contour is different from the first contour and configured such that the winding surface in a circumferential direction of the rotor is lengthened as compared to a winding surface of a pole shoe having an exclusively substantially sinusoidal outer side.

The document DE 10 2009 042 765 A1 relates to a permanently excited synchronous machine, having a stator and a rotor, which comprises multiple pole shoes distributed along the circumference having recesses to hold permanent magnets and recesses to hold dampening bars of a damper cage.

The document CN 102 055 258 A relates to a magnet pole shoe shape of a salient pole synchronous motor, wherein the magnet pole consists of a dovetail, a pole body, a pole shoe, a dampening winding, and an exciter winding. The rotor contour is divided into three regions, the middle region describing a circular arc. The other two regions are described as line segments.

BRIEF SUMMARY

Embodiments of the disclosure provide a rotor for an ESM and an ESM with reduced torque ripple.

Embodiments include a rotor for an externally excited synchronous machine, the pole shoes of which have an outer contour composed of straight line segments, the ends of which are situated on a line corresponding to a sine field pole contour. The special pole shoe shape serves for reducing the torque ripple. Instead of mapping the pole shoe contour as a continuous line drawing, it is composed of portions of straight line segments.

The sine field pole contour can be described by the following formulas:

$$R_2 = \sqrt[p]{\frac{F_0}{\cos(p\cdot\varphi)} + \sqrt{R_1^{2p} + \frac{F_0^2}{\cos^2(p\cdot\varphi)}}}$$

$$F_0 = \frac{(R_1-\delta_{min})^{2p} - R_1^{2p}}{2(R_1-\delta_{min})^p}.$$

$R_2$=rotor outer radius $R_1$: borehole radius of stator $\delta_{min}$: minimal air gap p: number of pole pairs $R_2$ (more precisely, $R_2(\varphi)$) is the distance of any given point of the outer contour of the pole shoe from the midpoint of the rotor in dependence on the angle $\varphi$ between the center axis of the pole and the connection line between the midpoint of the rotor and the point in question.

The outer contour of the rotor is obtained by starting with a sine field pole contour, selecting a number of points ("nodes") on the outer line of the sine field pole contour, and connecting these nodes with straight lines ("segments"). The nodes lie at the coordinates of the mathematical description for a sine field pole contour, the segments between the nodes being straight lines. In one embodiment, the nodes are equidistant.

Each time, a node is situated at the ends of the pole shoes. In one embodiment, a node is located in the middle of the outer contour of the pole shoes. In one embodiment, the outer contour is mirror symmetrical.

The number of nodes may be varied. In one embodiment, the outer contour of the pole shoes has an odd number of nodes. In one embodiment, the number may be in the range of 5 to 15 nodes, such as 7 to 13 nodes. In one embodiment, the outer contour of the pole shoes comprises 9 nodes.

In one embodiment, the rotor may comprise a pole wheel (armature) with exciter windings. The pole wheel is composed of individual slats of metal ("sheet metal"), which are arranged congruently one on top of another ("sheet metal stack"). Sheet metal stacks have the advantage of preventing eddy currents and thus heightening the efficiency. The individual metal sheets are coated with an insulator in order to avoid short circuits. In one embodiment, the metal sheets are made from a silicon-containing steel, which have improved magnetic properties.

Some embodiments provide a method for producing embodiments of the rotor described herein. In one embodiment of the method, the contour of the sheet metal is created by laser or water jet cutting. In another embodiment of the method, the contour of the sheet metal is punched out. The punch tool used to produce the sheet metal is adapted to creating the desired pole shoe contour.

The metal sheets are then stacked. In the case of a punching, this may occur directly in the machine, while in the other methods, a further process step may be necessary.

In one embodiment of the method, the individual sheets of metal after the punching are coated with a baking lacquer, formed in a stack, and then baked in an oven. In this way, on the one hand the layers are bonded together, and on the other hand they are also insulated.

Some embodiments of the disclosure provide an externally excited synchronous machine containing a rotor according to aspects of the embodiments described herein.

Thanks to the change from a continuous line sequence to a partially linearized pole contour, the torque ripple of the grooving harmonics can be significantly reduced and thus an acoustic abnormality of the corresponding motor order can be suppressed. Further benefits and embodiments of the disclosure will emerge from the description and the accompanying drawing.

Of course, the above mentioned features and those yet to be explained below can be used not only in the particular indicated combination, but also in other combinations or standing alone.

BRIEF DESCRIPTION OF THE SEVERAL VIEWS OF THE DRAWINGS

The embodiment is represented as an example with the aid of the accompanying drawing, and shall be further described with reference to the drawing.

FIG. 1 shows an embodiment of an externally excited synchronous machine (ESM).

DETAILED DESCRIPTION

FIG. 1 shows schematically a cutout portion of one embodiment of an externally excited synchronous machine (ESM) 1 having a rotor 10 and a stator 20. The ESM 1 is configured as an internal rotor and the rotor 10 is arranged in the central hollow of the stator 20.

The stator 20 comprises a plurality of stator teeth 22 and stator grooves 21 formed between the stator teeth 22.

The rotor 10 comprises a pole wheel 11, on which pole shoes 12 are formed, only one of which is shown in the FIGURE. The outer contour of the pole shoes 12 is minor symmetrical and composed of straight line segments 13, which meet at nodes 14. The nodes 14 lie exactly at the coordinates of the mathematical description for a sine field pole contour. In the embodiment shown, the outer contour has eight straight line segments 13 and nine nodes 14, although it is appreciated that the number of line segments and nodes may vary as described earlier.

German patent application no. 10 2022 127291.5, filed Oct. 18, 2022, to which this application claims priority, is hereby incorporated herein by reference, in its entirety.

Aspects of the various embodiments described above can be combined to provide further embodiments. In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. A rotor for an externally excited synchronous machine, comprising:

pole shoes having an outer contour composed of straight line segments, the ends of which are situated on a line corresponding to a sine field pole contour, wherein a respective winding is wrapped around each pole shoe of the pole shoes, wherein the sine field pole contour is defined by:

$$R_2 = \sqrt{\frac{F_0}{\cos(p\cdot\varphi)} + \sqrt{R_1^{2p} + \frac{F_0^2}{\cos^2(p\cdot\varphi)}}}\text{; and}$$

$$F_0 = \frac{(R_1-\delta_{min})^{2p} - R_1^{2p}}{2(R_1-\delta_{min})^p}\text{, and}$$

wherein:

$R_2$=an outer radius of the rotor;

p=a number of pole pairs present in the rotor;

$\phi$=an angle between a center axis of the pole and a connection line between a midpoint of the rotor and a respective point on the sine field pole contour;

$R_1$=a borehole radius of the rotor; and $\delta_{min}$=a minimum air gap between the pole shoes and a stator.

2. The rotor according to claim 1, wherein the outer contour of the pole shoes is mirror symmetrical.

3. The rotor according to claim 1, wherein the outer contour of the pole shoes comprises 4 to 14 line segments.

4. The rotor according to claim 3, wherein the outer contour of the pole shoes comprises 6 to 12 line segments.

5. The rotor according to claim 4, wherein the outer contour of the pole shoes comprises 8 line segments.

6. The rotor according to claim 1, comprising a pole wheel with exciter windings composed of individual sheet metal slats arranged congruently one on top of another.

7. The rotor according to claim 6, wherein the individual sheet metal slats are coated with an insulator.

8. An externally excited synchronous machine, comprising: a rotor according to claim 1.

9. A rotor for an externally excited synchronous machine, comprising:

pole shoes having an outer contour composed of straight line segments, the ends of which are situated on a line corresponding to a sine field pole contour, wherein the sine field pole contour is defined by:

$$R_2 = \sqrt{\frac{F_0}{\cos(p\cdot\varphi)} + \sqrt{R_1^{2p} + \frac{F_0^2}{\cos^2(p\cdot\varphi)}}}\text{; and}$$

$$F_0 = \frac{(R_1-\delta_{min})^{2p} - R_1^{2p}}{2(R_1-\delta_{min})^p}\text{, and}$$

wherein:

$R_2$=an outer radius of the rotor;

p=a number of pole pairs present in the rotor;

$\phi$=an angle between a center axis of the pole and a connection line between a midpoint of the rotor and a respective point on the sine field pole contour;

$R_1$=a borehole radius of the rotor; and $\delta_{min}$=a minimum air gap between the pole shoes and a stator.

10. A method for producing a rotor, the method comprising: punching sheet metal slats out with a punch tool, the punch tool adapted to give pole shoes of the sheet metal slats an outer contour composed of straight line segments, the ends of which are situated on a line corresponding to a sine field pole contour, wherein a respective winding is wrapped around each pole shoe of the pole shoes, wherein the sine field pole contour is defined by:

$$R_2 = \sqrt[\square]{\frac{F_0}{\cos(p \cdot \varphi)} + \sqrt{R_1^{2p} + \frac{F_0^2}{\cos^2(p \cdot \varphi)}}}\text{; and}$$

$$F_0 = \frac{(R_1 - \delta_{min})^{2p} - R_1^{2p}}{2(R_1 - \delta_{min})^p}\text{, and}$$

wherein:

$R_2$=an outer radius of the rotor;

p=a number of pole pairs present in the rotor;

ϕ=an angle between a center axis of the pole and a connection line between a midpoint of the rotor and a respective point on the sine field pole contour;

$R_1$=a borehole radius of the rotor; and $\delta_{min}$=a minimum air gap between the pole shoes and a stator.

11. The method according to claim 10, further comprising: after the punching, coating the sheet metal slats with a baking lacquer; arranging the sheet metal slats in a stack; and baking the stack of sheet metal slats in an oven.

* * * * *